R. L. DEZENDORF.
MEANS FOR TESTING METERS.
APPLICATION FILED APR. 8, 1916.
1,306,657.
Patented June 10, 1919.
3 SHEETS—SHEET 2.
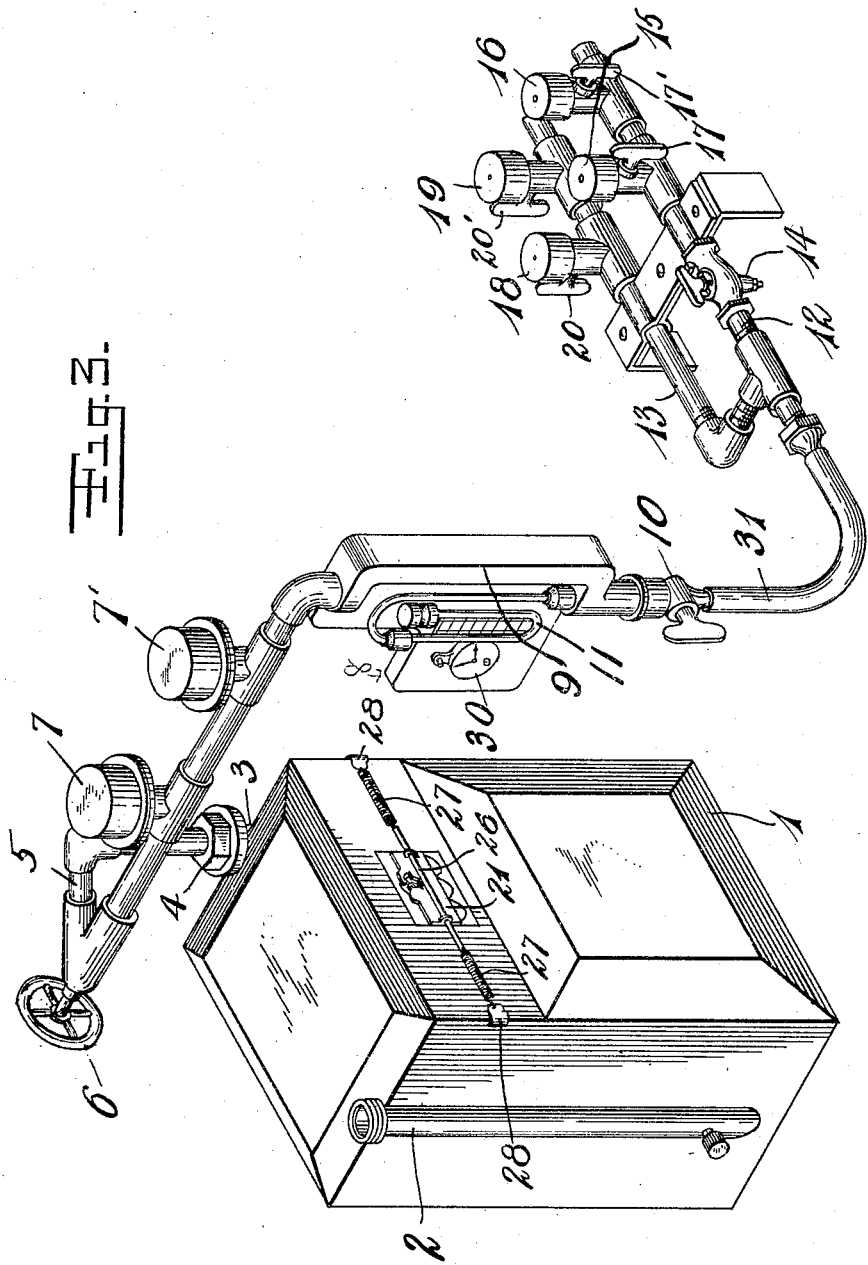

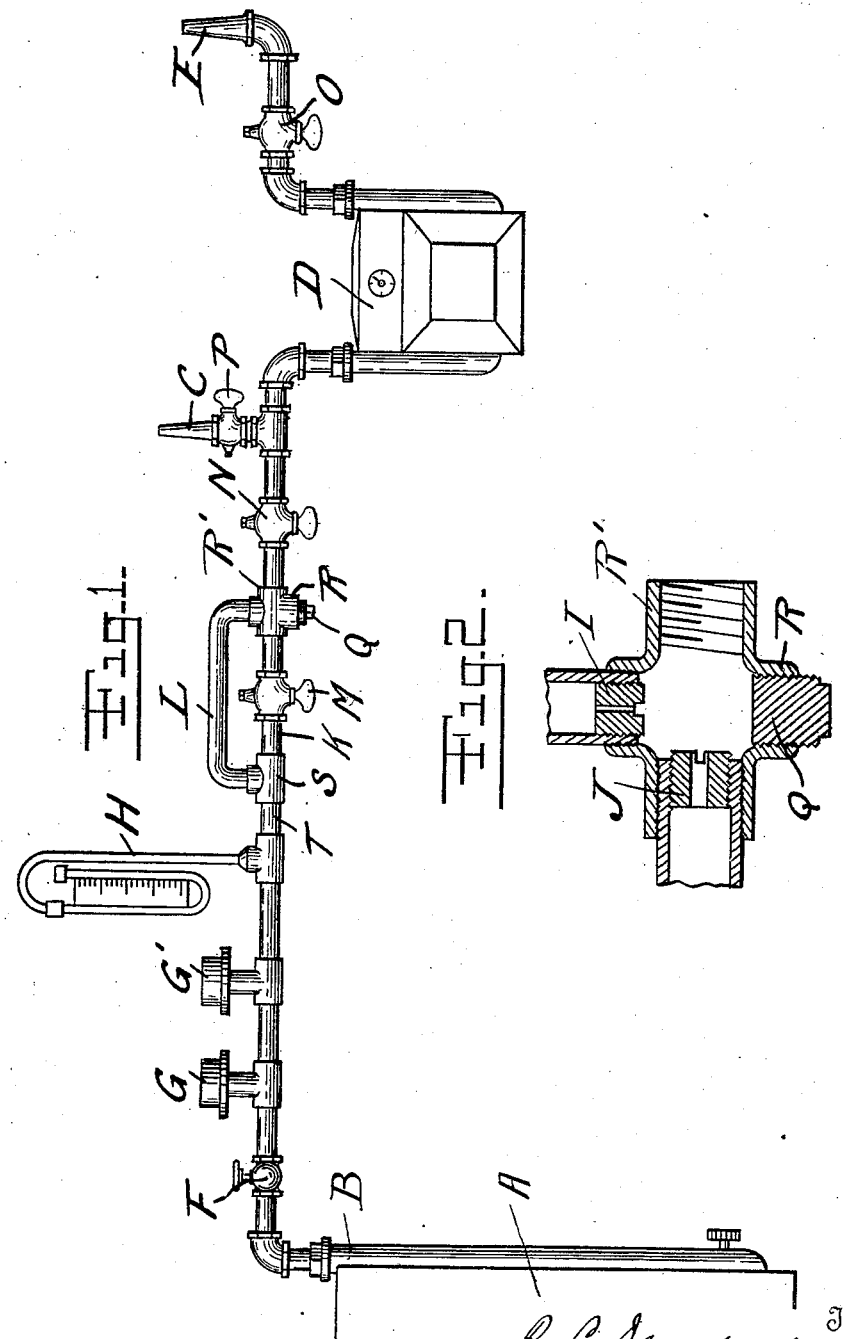

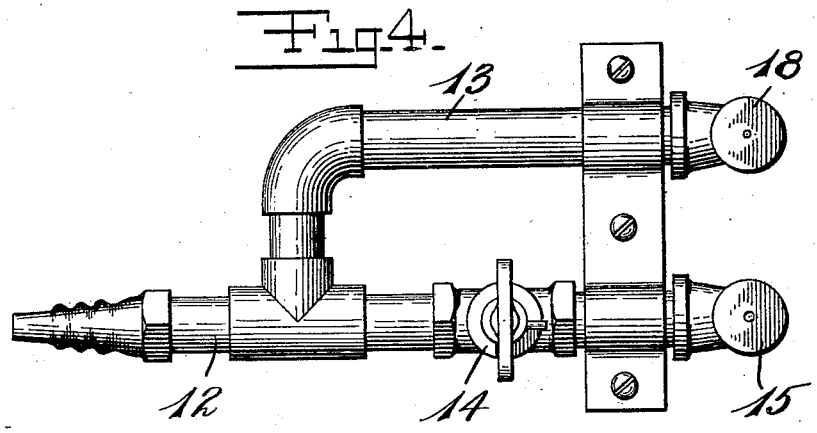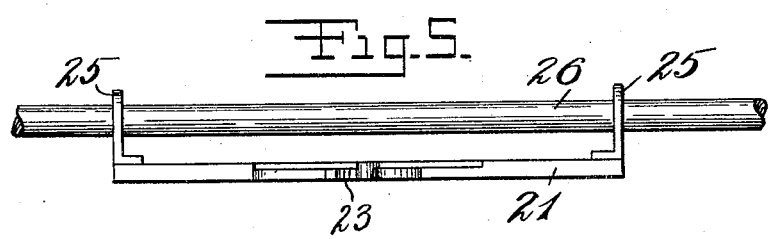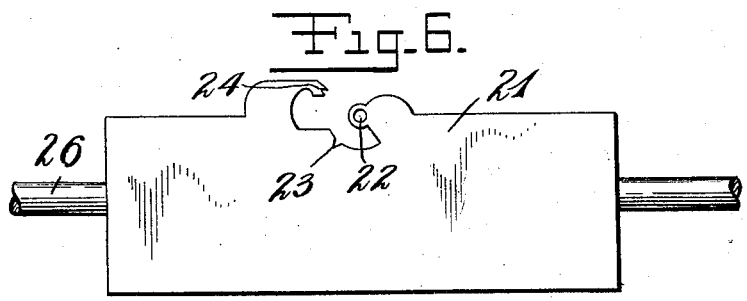

UNITED STATES PATENT OFFICE.

RICHARD LEE DEZENDORF, OF RICHMOND HILL, NEW YORK.

MEANS FOR TESTING METERS.

1,306,657.     Specification of Letters Patent.     Patented June 10, 1919.

Application filed April 8, 1916. Serial No. 89,754.

*To all whom it may concern:*

Be it known that I, RICHARD L. DEZENDORF, a citizen of the United States, residing at Richmond Hill, county of Queens, State of New York, have invented a certain new and useful Improvement in Means for Testing Meters, of which the following is a full, clear, and exact description.

My invention relates to improvements and means for testing gas meters *in situ*, and has for its object to provide a simple and efficient means for determining whether the meter being tested is in condition to register accurately the amount of gas that passes through it, and to do this without disconnecting the meter from the supply main. It further has for its object to produce means for doing this in a comparatively short length of time. It further has for its object to provide testing means which are applicable to meters which are now generally in use.

The following is a description of an embodiment of my invention, reference being had to the accompanying drawing, in which—

Figure 1 shows a side elevation of a meter with the testing means embodying my invention applied thereto.

Fig. 2 shows in sectional detail one of the fittings used in this embodiment.

Fig. 3 is a perspective view of the meter with a modified means embodying my invention.

Fig. 4 is a plan view of a two-port burner forming part of the modified means.

Fig. 5 is a plan view of a detachable calibrating device for use with the meter to be tested together with the supporting rod therefor.

Fig. 6 is a rear side elevation of the same.

Referring more particularly to the drawing, A is a meter to be tested, the outlet port of which B is connected to the testing apparatus. The testing apparatus consists of a pipe having various instrumentalities and terminating in a burner C, a test-meter D, and in a second burner E. Adjacent to the meter to be tested is a gate valve F. Following this gate valve are two pressure regulators G G'. Then comes a pressure indicator H. Then comes a very important element in my invention consisting in a connection having two ports I and J, one of which I is a small port so as to put a small load upon the meter, while the other J is a large port. These ports are in two separate branches of the connection; the first in the branch L and the other in the pipe K. For convenience they may be located at the fitting R. In the branch K is a cock M, whereby the large port can be cut off without cutting off the small port. Another cock N is provided so that the passage of gas through both ports can be cut off simultaneously. Other cocks O and P are provided for cutting off the flow of gas through the burners E and C respectively. This apparatus can be used to test meters in two ways, *i. e.*, by the use of the burner C, the cock O being closed, or by the use of the test meter D and burner E, the cock P being closed.

In order that the burner C may be used in testing, the ports I and J must be carefully calibrated. Preferably, they are calibrated so that if the port I is allowed to discharge for five minutes and then the ports I and J are allowed to discharge simultaneously for five minutes the amount of gas passed in the ten minutes will be two cubic feet. These times and this amount are not essential so long as the amount of gas being passed by I in a given period and by I and J in a given period when added together equals some amount which can be easily and accurately read upon the meter being tested.

If the test meter is being used for testing this calibration is not necessary, although even in that case the port I should constitute only a very small load and the port J should constitute a much larger load. Moreover, when the test meter is being used time is not of essence, although the elapsed time during which the small port I is alone in use should be substantial.

In testing by means of the burner C, ports I and J should be calibrated as above stated. In carrying out this test, I first close the cock O, open the cock P to the burner C and the cock N and then adjust the valve F so that the proper pressure will be indicated at the indicator H, preferably one and one-half inches water pressure. The regulators G and G' regulate this pressure when the valve F is once adjusted. I then close the cock N, the cock P being open, and then close the cock M, I then make use of a suitable time piece and wait until the pointer of the time piece registers the beginning of some minute. I then open the cock N and permit gas to escape by the burner C, igniting the same. After the gas has been burning for five minutes I open the cock M and permit the gas to escape for another five minutes and then close the cock N (or cock P). If the ports I and J have been properly calibrated two cubic feet will have escaped during this ten minutes, and if the meter to be tested registers two cubic feet, I know that it is reasonably accurate. If, however, it fails to register two cubic feet, that is, it falls short of two cubic feet, I know that it is running slow and needs attention. By this means in the short period of ten minutes a test can be given to a meter *in situ* which will determine whether it is running slow.

When the test meter D is being used I close the valve P so as to cut off the burner C, I then open the cock O and the cock M and set the valve F as before, I then close the cock M and read both meters, preferably adjusting the indicator hand on the test meter so that it corresponds to the hand on the upper dial of the meter to be tested, I then close the cock M and open the cock N, I then permit the gas to flow from the burner E, lighting the same, for a substantial period of say five minutes, and then open the valve M permitting the gas to flow through both ports I and J for another period of five minutes or preferably until the hand on one of the meters indicates two feet, I then close the cock N (or the cock O), I then compare the readings of the two meters. If the test meter registers two feet, and the meter to be tested fails to register two feet, I know that the meter to be tested is slow. If the meter to be tested registers two feet and the test meter registers more than two feet I again know that the meter to be tested is slow, and needs attention.

The important errors will for the most part result from the operation when the port I alone is used, since the errors which occur when the large port is being used being of comparative insignificance in most cases. The presence of the large port, however, enables me to obtain in a comparatively short time a large movement of the indicating hand on the meter to be tested. By providing the screw-threaded plug Q, I am enabled to remove the small port I for the purpose of cleaning the same, or of substituting a port of different size therefor for use in testing a meter of another size, a larger small port being permissible when a larger size meter is being tested. The larger port J may be removed by disconnecting the pipe from the nipple R' of the connection R.

Referring to the modification shown in Fig. 3 1 is an ordinary gas meter having the ordinary inlet port 2 and outlet port 3. Connected to the outlet port by a suitable coupling 4 is a pipe 5 having therein an ordinary valve 6. 7 and 7' are two pressure regulators connected in series for controlling the pressure of the gas supplied by the pipe 5. 8 is a base having upon one side thereof an enlargement 9 containing a passage which communicates with the pipe 5 and is controlled by the stop cock 10. 11 is a pressure indicator of the ordinary water type which has one end in communication with the interior of the passage in the portion 9. 30 is a time piece supported upon the base 8. Connected to the nipple in which the valve 10 terminates by a flexible tubing 31 is what I term a "two-port burner." This burner consists of two pipes 12 and 13, the former having a stop cock 14. These pipes have closed ends and supply a plurality of burner tips 15—16, which are controlled respectively by cocks 17 and a plurality of burner tips 18 and 19, each of which is controlled by one of the stop cocks 20. The pipe 13 has no other stop cock in it, that is, has no stop cock similar to the stop cock 14. The burner tip 15 has a comparatively large opening. The burner tip 18 which is used in conjunction therewith has a small opening, such that it will burn only about four feet per hour, if the device is to be used for testing say three or five light gas meters. For such a meter the amount of gas discharged by both burners 15 and 18 should be about 12 feet per hour. The burners 15 and 18 should be such that when the burner 15 is used alone for five minutes, and thereafter the burners 15 and 18 are used together, about two feet of gas will be consumed in about the ten minutes elapsed. The openings in the tips 16 and 19 are larger than the openings in the tips 15 and 18 and are used for testing larger sized meters, the opening in the tip 16 being very much larger than the opening in the tip 19.

In order to enable one to read more accurately the movement of the upper hand of the registry dial and to provide removable calibration marks for reading quarter revolutions of the upper hand, I provide a calibration plate 21, carrying a peep-hole 22, and calibration marks 23—24. This plate is provided with ears 25 and plate 21 is by them slidingly mounted upon a rod 26, to the ends of which are connected springs 27 to which springs are connected hooks 28. By distending the spring 27 the hooks 28 can be made to engage opposite sides of the meter casing, so as to hold the plate 21 close against the face of the glass covering the dial of the meter. By sliding the plate 21 upon the rod 26 and moving the hooks 28 lightly up and down upon the casing the hole 22 is brought directly over the axis of the hand upon the upper dial. This brings the calibration marks 23 and 24 in a position which enables one to determine the length of time taken to read a quarter of a revolution of the upper dial hand as it passes from the calibration mark 23 to the calibration mark 24, a distance which corresponds exactly to 90° and in the ordinary meter when running correctly indicates the consumption of one half foot of gas.

In testing a three light meter with my apparatus I open the cocks 17 and 20 (the cocks 17' and 20' being closed) and then open the cocks 10 and 14. I then adjust the valve 6 until the gage 11 registers the proper testing pressure, ordinarily one and one-half inches water pressure. When the upper dial hand has reached the proper starting point, I turn off the cock 10. I then turn off the cock 14 and note the time as indicated by the time piece 30. I then turn on the cock 10 and light the gas discharging from the small port in the burner 18. I then permit the apparatus to run for a predetermined time, say, five minutes, and then open the cock 14. A slight wave of the hand in the neighborhood of the tips 15 and 18 causes the gas escaping from the burner 15 to be ignited by the flame at 18. I then permit both burners 15 and 18 to burn until a certain calculated time has elapsed, the time being such that the amount of gas escaping from the burner 18 during both periods plus the amount of gas escaping from the burner 15 during the latter period amounts to 2 cubic feet. After this period has elapsed I close the cock 10. This completes the test. If the meter is registering correctly, the test hand on the upper dial should have made one complete revolution. If the meter is slow, the test hand will not have reached the starting point. The test shows the fact of error, if error exists, and also indicates whether the error is so serious as to require repair. The most important part of the testing is done under the small load during the time that the burner 18 only is in use, under which condition the error is of the greatest importance, since meters under large loads will oftentimes run with substantial correctness, when with the same meter running under small load the proportion of error will be great. A meter which leaks may pass enough gas to support a small flame without registering at all and yet the leakage may be such as not to introduce substantial error while a large amount of gas is passing. The test by my apparatus can be made in a short period of time. The length of the periods and the sizes of the holes in the two tips is a matter of simple mathematical calculation, but care must be taken that the hole in the tip 18 is so small as to put only a very small load upon the meter while the hole in the burner 15 should be large enough to permit the complete revolution of the indicator hand in a comparatively short time. For larger meters the tips 15 and 18 can be replaced by other burners having larger openings, or such other burners as 16 and 19 may be provided, one set being cut out by their cocks and the other set of burners being cut in as desired.

By the use of my calibration device 21, error can be detected in a similar manner by the use of even shorter periods of time, calculated according to relative sizes of the ports in the tips 15 and 18 or 16 and 19, or if the error is considerable it can be detected by timing the pointer as it passes from the calibration mark 23 toward the mark 24 with the tip 18 only in use, the time which should be required in an accurate meter for the hand to revolve a quarter of a revolution under these conditions being easily ascertained by mathematical calculation.

It will be noted that the pipe T is provided with a two-port discharge, one of which ports I is of small capacity while the other J is of larger capacity, and that the cock M constitutes means for closing the large port J without closing the passage through the small port I; and that the valve N constitutes a means for simultaneously preventing the flow of gas through both ports I and J, while in the modification the burners 15 and 18 constitute a two-port discharge for the pipe 31, the port 18 being small and the port 15 large; that the valve 14 constitutes means for closing the passage through the large port without closing the passage through the small port and that the cock 10 constitutes means for preventing the flow of gas through both ports. The fact that the small port 18 is open at the same time as the large port 15 is immaterial if the ports are properly calibrated and the gas going through them during the two periods is properly calculated or measured. It is very important, however, with both modifications of my invention to be able to close the large port without closing the small port, so as to make part of the test on small load.

Gas can be passed through the meter and discharged through the outlet C located in the connection between the meter to be tested and the test meter D so that the index of the meter to be tested can be brought to a proper starting point before the test by the test meter is begun, whereupon the cock P is closed.

As will be evident to those skilled in the art, my invention permits of various modifications without departing from the spirit thereof or the scope of the appended claims.

What I claim is:

1. In an apparatus for testing gas meters *in situ*, the combination of a connection from the delivery port of the meter, a two-port discharge therefor, one port being calibrated to deliver gas constituting a definite small load upon the meter, the other port being calibrated to deliver a considerably larger amount of gas, means for closing said second port without closing the passage to said first port and controlling the flow of gas through both ports and means for burning the gas discharged during the test.

2. In an apparatus for testing gas meters *in situ*, the combination of a connection from the delivery port of the meter, a two-port discharge therefor, one port being calibrated to deliver gas constituting a definite small load upon the meter, the other port being calibrated to deliver a considerably larger amount of gas, means for closing said second port without closing the passage to said first port and controlling the flow of gas through both ports, and means for controlling the pressure of the gas supplied to said ports.

3. In an apparatus for testing gas meters *in situ*, the combination of a connection from the delivery port of the meter, a two-port discharge therefor, one port delivering gas constituting a small load upon the meter, the other port delivering a considerably larger amount of gas, means for closing said second port without closing the passage to said first port, and controlling the flow of gas through both ports, means for controlling the pressure of the gas supplied to said ports, and a pressure indicator between said meter and said ports.

4. In an apparatus for testing gas meters *in situ*, the combination of a connection from the delivery port of the meter, a two-port discharge therefor, one port delivering gas constituting a small load upon the meter, the other port delivering a considerably larger amount of gas, means for closing said second port without closing the passage to said first port, and controlling the flow of gas through both ports, a pressure-regulating device between said meter and said ports and a valve between said pressure-regulating device and said meter for controlling the flow of gas to said regulating device.

5. In an apparatus for testing gas meters *in situ*, the combination of a connection from the delivery port of the meter, a two-port discharge therefor, one port delivering gas constituting a small load upon the meter, the other port delivering a considerably larger amount of gas, means for closing said second port without closing the passage to said first port and controlling the flow of gas through both ports, and means for measuring the amount of gas discharged through said discharge.

6. In an apparatus for testing gas meters *in situ*, the combination of a connection from the delivery port of the meter to be tested, said connection having means for measuring the amount of gas discharged therethrough, means for burning the gas discharged and means adjacent to said measuring means for varying the passage through said connection so as to change the load upon the meter from a small load to a large load and vice versa during a test.

7. In an apparatus for testing gas meters *in situ*, the combination of a connection from the delivery port of the meter to be tested, said connection having means for measuring the amount of gas discharged therethrough, means for burning the gas discharged and means adjacent to said measuring means for varying the passage through said connection so as to change the load upon the meter from a small load to a large load and vice versa during a test, and means located on the discharge side of the measuring means for completely shutting off the flow of gas.

8. In an apparatus for testing gas meters *in situ*, the combination of a connection from the delivery port of the meter to be tested, said connection having means for measuring the amount of gas discharged therethrough, and means adjacent to said measuring means for varying the passage through said connection so as to change the load upon the meter from a small load to a large load and vice versa during a test, and an exhaust outlet located in said connection and between said measuring means and said meter, and means for opening and closing said outlet.

RICHARD LEE DEZENDORF.

Copies of this patent may be obtained for five cents each, by addressing the "Commissioner of Patents, Washington, D. C."

Correction in Letters Patent No. 1,306,657.

It is hereby certified that in Letters Patent No. 1,306,657, granted June 10, 1919, upon the application of Richard Lee Dezendorf, of Richmond Hill, New York, for an improvement in "Means for Testing Meters," an error appears in the printed specification requiring correction as follows: Page 2, line 21, for the reference-letter "M" read *N;* and that the said Letters Patent should be read with this correction therein that the same may conform to the record of the case in the Patent Office.

Signed and sealed this 29th day of July, A. D., 1919.

[SEAL.]

Cl. 73—51.

J. T. NEWTON,
*Commissioner of Patents.*